W. F. RUST.
COOLING RACK.
APPLICATION FILED MAR. 3, 1910.

1,006,982.

Patented Oct. 24, 1911.

UNITED STATES PATENT OFFICE.

WILLIAM F. RUST, OF YOUNGSTOWN, OHIO.

COOLING-RACK.

1,006,982.  Specification of Letters Patent.  Patented Oct. 24, 1911.

Application filed March 3, 1910. Serial No. 547,072.

*To all whom it may concern:*

Be it known that I, WILLIAM F. RUST, a citizen of the United States, residing at Youngstown, in the county of Mahoning and State of Ohio, have invented or discovered new and useful Improvements in Cooling-Racks, of which the following is a specification.

My invention relates to rotary cooling racks for use with rolling mills, galvanizing plants, and the like, and the object thereof is to produce a rotary cooling rack in which the radial spaces for the galvanized or other sheets are formed by a number of rods arranged parallel to the axis of the rack and connected to the ends thereof.

Figure 1:
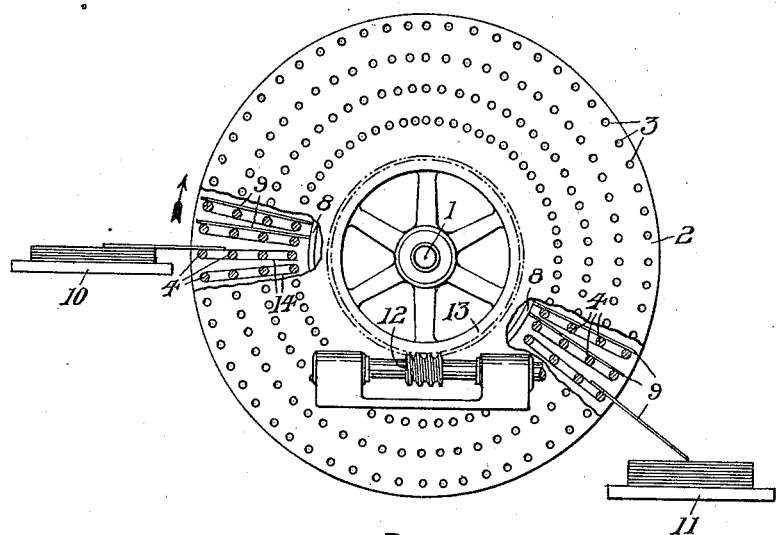
Figure 2:
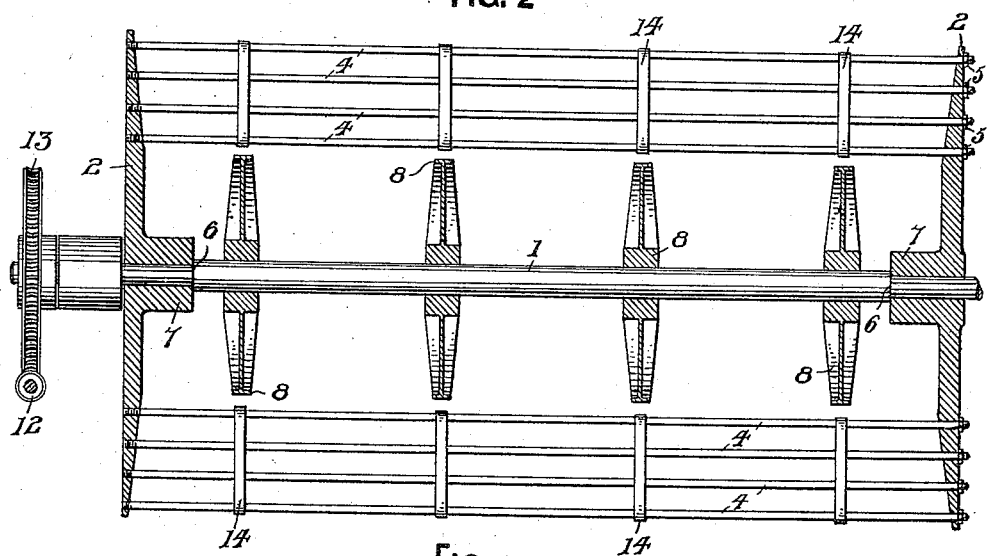
Figure 3:
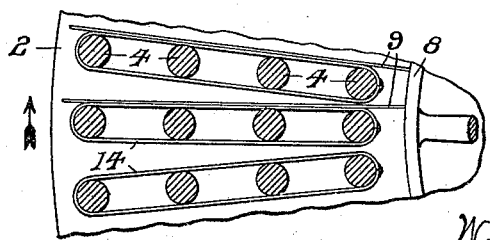

Referring to the accompanying drawing, Figure 1 is an end view of the preferred form of a cooling rack constructed in accordance with my invention and having parts of the end broken away; Fig. 2 a central longitudinal section of said cooling rack; and Fig. 3, a fragmentary enlarged sectional view taken transversely of the said radial spaces.

On the drawings, 1 is the shaft carrying the spaced-apart end disks or heads 2. The heads 2 are duplicates, each being provided with four, more or less, annular series of holes 3, the said series being concentric with the said shaft 1. The holes in the several series are arranged in radial rows, each including one hole of each series. Steel rods 4 extend from one head to the other and have their ends secured therein in any desired manner. I have shown the rods having their right-hand ends passing through unthreaded holes in the corresponding head, nuts 5 being provided on the ends of the rods and bearing against the outer face of the head, whereby the rods may be secured on the head and given the required degree of tension. The left-hand end of the rods may be similarly secured in the corresponding head, but I have shown them threaded therein. It will be seen that by turning up the nuts I can place the rods under strong tension, the heads being held a certain distance apart by means of the shoulders 6 on the shaft 1 which engage the ends of the hubs 7 of the heads. The heads are arranged so that the rods in each row of four are in a plane, which preferably includes the shaft 1. Thus, it is seen that I provide radial spaces between consecutive rows of rods, the spaces extending from head to head.

On the shaft 1 between the heads 2 I place a number of gage wheels 8 of equal diameter whose peripheries lie within the innermost circle of bars 4. The heads 2, the radial rows of bars 4, and the wheels 8 form radial pockets into which galvanized or other sheets 9 may be fed, as from the table 10, and carried as the cooling rack rotates with the arrow, Figs. 1 and 3, until they are discharged by gravity or otherwise upon the table 11 or other device. Though I have described and shown the bars arranged in radial rows so as to form the sides of radial pockets, it is clear that they may be arranged otherwise. I may at suitable distances place guides 14 on the rows of bars which form the sides of the aforesaid pockets. These guides may be made of sheet metal bands passed around each group of bars, the ends of the bands being welded or otherwise secured together.

The cooling rack may be rotated step by step by the worm 12 which meshes with the worm 13 on the end of the shaft 1. I have shown no mechanism for actuating the worm as mechanism for intermittently actuating shafts is very old and well known.

By the use of the bars 4 which are preferably round, the sheets to be cooled are almost entirely exposed to the cooling action of the air.

I claim—

1. In a rotary cooling rack, a pair of spaced heads, and bars connecting the heads and arranged in series of lines parallel with the axis of rotation of the heads whereby consecutive lines of bars form between them conveying spaces.

2. In a rotary cooling rack, a pair of spaced heads, bars connecting the heads and arranged in series of lines parallel with the axis of rotation of the heads whereby consecutive lines of bars form between them conveying spaces, and guides connecting the members of each line.

3. In a rotary cooling rack, a pair of spaced heads, bars connecting the heads and arranged in series of lines parallel with the axis of rotation of the heads whereby consecutive lines of bars form between them conveying spaces, and guides connecting the members of each line, the guides being formed of endless strips of metal extending around the said lines.

4. In a rotary cooling rack, a pair of spaced heads, bars connecting the heads and arranged in series of lines parallel with the axis of rotation of the heads whereby consecutive lines of bars form between them conveying spaces, and means for limiting the depth of the several spaces.

5. In a rotary cooling rack, a pair of spaced heads, bars connecting the heads and arranged in series of lines parallel with the axis of rotation of the heads whereby consecutive lines of bars form between them conveying spaces, and circular devices inclosed by the said series of lines of bars to limit the depth of the said spaces.

Signed at Youngstown, O., this 14 day of February, 1910.

WILLIAM F. RUST.

Witnesses:
 THOMAS F. LOGAN,
 LEIF LEE.

Copies of this patent may be obtained for five cents each, by addressing the "Commissioner of Patents, Washington, D. C."